United States Patent
Greco (10) Patent No.: US 11,085,808 B2
(45) Date of Patent: Aug. 10, 2021

(54) DETERMINING A ZERO OFFSET OF A VIBRATORY METER AT A PROCESS CONDITION

(71) Applicant: Micro Motion, Inc., Boulder, CO (US)

(72) Inventor: Salvatore D. Greco, Arvada, CO (US)

(73) Assignee: Micro Motion, Inc., Boulder, CO (US)

( * ) Notice: Subject to any disclaimer, the term of this patent is extended or adjusted under 35 U.S.C. 154(b) by 125 days.

(21) Appl. No.: 16/491,762

(22) PCT Filed: Mar. 20, 2017

(86) PCT No.: PCT/US2017/023158
§ 371 (c)(1),
(2) Date: Sep. 6, 2019

(87) PCT Pub. No.: WO2018/174841
PCT Pub. Date: Sep. 27, 2018

(65) Prior Publication Data
US 2020/0249063 A1 Aug. 6, 2020

(51) Int. Cl.
*G01F 25/00* (2006.01)
*G01F 1/84* (2006.01)

(52) U.S. Cl.
CPC ........ *G01F 25/0007* (2013.01); *G01F 1/8436* (2013.01); *G01F 1/8477* (2013.01)

(58) Field of Classification Search
None
See application file for complete search history.

(56) References Cited

U.S. PATENT DOCUMENTS

| | | | |
|---|---|---|---|
| 2004/0200259 A1 | 10/2004 | Mattar | |
| 2012/0125124 A1* | 5/2012 | Hays | G01F 25/0007 73/861.357 |
| 2017/0131128 A1* | 5/2017 | Zimmer | G01F 15/024 |
| 2017/0254688 A1* | 9/2017 | Patten | G01F 25/0007 |

FOREIGN PATENT DOCUMENTS

| | | |
|---|---|---|
| JP | 2007163203 A | 6/2007 |
| WO | 2016010514 A1 | 1/2016 |

* cited by examiner

*Primary Examiner* — Harshad R Patel
(74) *Attorney, Agent, or Firm* — The Ollila Law Group LLC (57) ABSTRACT

A method of determining a zero offset of a vibratory meter at a process condition is provided. The method includes measuring a flow rate of a material in the vibratory meter, determining if the measured flow rate is less than a low flow threshold, measuring one or more operational parameters of the vibratory meter, determining if the one or more measured operational parameters of the vibratory meter are within a corresponding range, and if the measured flow rate is less than the low flow threshold and if the one or more measured operational parameters of the vibratory meter are within the corresponding range, then determining a zero offset of the vibratory meter based on the measured flow rate.

18 Claims, 5 Drawing Sheets

DETERMINING A ZERO OFFSET OF A VIBRATORY METER AT A PROCESS CONDITION

TECHNICAL FIELD

The embodiments described below relate to determining a zero offset for vibratory meters and, more particularly, to a zero offset of a vibratory meter at a process condition.

BACKGROUND

Vibrating sensors, such as for example, vibrating densitometers and Coriolis flowmeters are generally known, and are used to measure mass flow and other information for materials flowing through a conduit in the flowmeter. Exemplary Coriolis flowmeters are disclosed in U.S. Pat. Nos. 4,109,524, 4,491,025, and Re. 31,450, all to J. E. Smith et al. These flowmeters have one or more conduits of a straight or curved configuration. Each conduit configuration in a Coriolis mass flowmeter, for example, has a set of natural vibration modes, which may be of simple bending, torsional, or coupled type. Each conduit can be driven to oscillate at a preferred mode.

Material flows into the flowmeter from a connected pipeline on the inlet side of the flowmeter, is directed through the conduit(s), and exits the flowmeter through the outlet side of the flowmeter. The natural vibration modes of the vibrating system are defined in part by the combined mass of the conduits and the material flowing within the conduits.

When there is no-flow through the flowmeter, a driving force applied to the conduit(s) causes all points along the conduit(s) to oscillate with identical phase or a small "zero offset", which is a time delay measured at zero flow. As material begins to flow through the flowmeter, Coriolis forces cause each point along the conduit(s) to have a different phase. For example, the phase at the inlet end of the flowmeter lags the phase at the centralized driver position, while the phase at the outlet leads the phase at the centralized driver position. Pickoffs on the conduit(s) produce sinusoidal signals representative of the motion of the conduit (s). Signals output from the pickoffs are processed to determine the time delay between the pickoffs. The time delay between the two or more pickoffs is proportional to the mass flow rate of material flowing through the conduit(s).

Meter electronics connected to the driver generate a drive signal to operate the driver and determine a mass flow rate and other properties of a material from signals received from the pickoffs. The driver may comprise one of many well-known arrangements; however, a magnet and an opposing drive coil have received great success in the flowmeter industry. An alternating current is passed to the drive coil for vibrating the conduit(s) at a desired flow tube amplitude and frequency. It is also known in the art to provide the pickoffs as a magnet and coil arrangement very similar to the driver arrangement. However, while the driver receives a current which induces a motion, the pickoffs can use the motion provided by the driver to induce a voltage. The magnitude of the time delay measured by the pickoffs is very small; often measured in nanoseconds. Therefore, it is necessary to have the transducer output be very accurate.

Generally, a Coriolis flowmeter can be initially calibrated and a flow calibration factor along with a zero offset can be generated. In use, the flow calibration factor can be multiplied by the time delay measured by the pickoffs minus the zero offset to generate a mass flow rate. In most situations, the flowmeter is initially calibrated, typically by the manufacturer, and assumed to provide accurate measurements without subsequent calibrations required.

As mentioned above, in many vibrating sensors, including Coriolis flowmeters, a zero offset may be present, which prior art approaches initially correct for. Although this initially determined zero offset can adequately correct the measurements in limited circumstances, the zero offset may change over time due to a change in a variety of operating conditions, mainly temperature, resulting in only partial corrections. However, other operating conditions may also affect the zero offset, including pressure, fluid density, sensor mounting conditions, etc. Furthermore, the zero offset may change at a different rate from one meter to another. This may be of particular interest in situations where more than one meter is connected in series such that each of the meters should read the same if the same fluid flow is being measured.

Therefore, there is a need in the art for a method to determine and compensate for changes in the zero offset of vibrating sensors that experience changes in operating temperature.

SUMMARY

A method of determining a zero offset of a vibratory meter at a process condition is provided. According to an embodiment, the method comprises measuring a flow rate of a material in the vibratory meter, determining if the measured flow rate is less than a low flow threshold, measuring one or more operational parameters of the vibratory meter, determining if the one or more measured operational parameters of the vibratory meter are within a corresponding range, and if the measured flow rate is less than the low flow threshold and if the one or more measured operational parameters of the vibratory meter are within the corresponding range, then determining a zero offset of the vibratory meter based on the measured flow rate.

A vibratory meter with a zero offset at a process condition is provided. According to an embodiment, the vibratory meter comprises a sensor assembly and a meter electronics communicatively coupled to the sensor assembly. The meter electronics is configured to measure a flow rate of a material in the sensor assembly, determine if the measured flow rate is less than a low flow threshold, measure one or more operational parameters of the material, determine if the one or more measured operational parameters is within a corresponding range, and if the measured flow rate is less than the low flow threshold and if the one or more measured operational parameters of the vibratory meter are within the corresponding range, then determining a zero offset of the vibratory meter based on the measured flow rate.

ASPECTS

According to an aspect, a method of determining a zero offset of a vibratory meter at a process condition comprises measuring a flow rate of a material in the vibratory meter, determining if the measured flow rate is less than a low flow threshold, measuring one or more operational parameters of the vibratory meter, determining if the one or more measured operational parameters of the vibratory meter are within a corresponding range, and if the measured flow rate is less than the low flow threshold and if the one or more measured operational parameters of the vibratory meter are within the corresponding range, then determining a zero offset of the vibratory meter based on the measured flow rate.

Preferably, the one or more measured operational parameters of the vibratory meter comprise at least one of a temperature, density, pickoff voltage, and drive gain.

Preferably, the zero offset comprises a difference between the measured flow rate and zero flow.

Preferably, measuring the one or more operational parameters comprises measuring each of the one or more operational parameters a plurality of times when the measured flow rate is less than the low flow threshold.

Preferably, determining a zero offset of the vibratory meter based on the measured flow rate that is less than the low flow threshold comprises determining the zero offset if a plurality of measurements of each of the one or more measured operational parameters is within the corresponding range.

Preferably, the measured flow rate of the material in the vibratory meter comprises a plurality of the measured flow rates and the determining the zero offset of the vibratory meter based on the measured flow rates comprises determining the zero offset of the vibratory meter based on the plurality of the measured flow rates.

Preferably, the plurality of the measured flow rates comprises at least one group of measured flow rates that are consecutive.

Preferably, the zero offset is determined based on the measured flow rate if and only if all of the one or more measured parameters are within the corresponding range.

Preferably, further comprising measuring the flow rate the material with the zero offset of the vibratory meter determined based on the measured flow rate that is less than the low flow threshold.

According to an aspect, a vibratory meter (5) with a zero offset at a process condition comprises a sensor assembly (10) and a meter electronics (20) communicatively coupled to the sensor assembly (10). The meter electronics (20) is configured to measure a flow rate of a material in the sensor assembly (10), determine if the measured flow rate is less than a low flow threshold, measure one or more operational parameters of the material, determine if the one or more measured operational parameters is within a corresponding range, and if the measured flow rate is less than the low flow threshold and if the one or more measured operational parameters of the vibratory meter (5) are within the corresponding range, then determining a zero offset of the vibratory meter (5) based on the measured flow rate.

Preferably, the one or more measured operational parameters of the vibratory meter comprise at least one of a temperature, density, pickoff voltage, and drive gain.

Preferably, the zero offset comprises a difference between the measured flow rate and zero flow.

Preferably, the meter electronics (20) being configured to measure the one or more operational parameters comprises the meter electronics (20) being configured to measure each of the one or more operational parameters a plurality of times when the measured flow rate is less than the low flow threshold.

Preferably, the meter electronics (20) being configured to determine a zero offset of the vibratory meter (5) based on the measured flow rate that is less than the low flow threshold comprises the meter electronics (20) being configured to determine the zero offset if a plurality of measurements of each of the one or more measured operational parameters is within the corresponding range.

Preferably, the measured flow rate of the material in the vibratory meter comprises a plurality of the measured flow rates and the meter electronics (20) being configured to determine the zero offset of the vibratory meter (5) based on the measured flow rates comprises the meter electronics (20) being configured to determine the zero offset of the vibratory meter (5) based on the plurality of the measured flow rates.

Preferably, the plurality of the measured flow rates comprises at least one group of measured flow rates that are consecutive.

Preferably, the zero offset is determined based on the measured flow rate if and only if all of the one or more measured parameters are within the corresponding range.

Preferably, further comprising the meter electronics (20) being configured to measure the flow rate the material with the zero offset of the vibratory meter (5) determined based on the measured flow rate that is less than the low flow threshold.

BRIEF DESCRIPTION OF THE DRAWINGS

The same reference number represents the same element on all drawings. It should be understood that the drawings are not necessarily to scale.

DETAILED DESCRIPTION

FIGS. 1-5 and the following description depict specific examples to teach those skilled in the art how to make and use the best mode of embodiments of determining a zero offset of a vibratory meter at a process condition. For the purpose of teaching inventive principles, some conventional aspects have been simplified or omitted. Those skilled in the art will appreciate variations from these examples that fall within the scope of the present description. Those skilled in the art will appreciate that the features described below can be combined in various ways to form multiple variations of the determining a zero offset of a vibratory meter at a process condition. As a result, the embodiments described below are not limited to the specific examples described below, but only by the claims and their equivalents.

The zero offset can be determined by measuring a flow rate of a material in a vibratory meter. The method and vibratory meter can determine if the measured flow rate is less than a low flow threshold. If the measured flow rate is less than the low flow threshold and if one or more operational parameters, such as, for example, temperature, density, pickoff voltage, and/or drive gain, are within a corresponding range, then the zero offset can be determined based on the measured flow rate. As will be explained below, the measured operational parameters can be used to determine that the measured flow rate reflects an actual no-flow condition in the vibratory meter and therefore can be used for a new zero offset. Since the one or more operational parameters reflect the process condition of the vibratory meter, the new zero offset is determined for the process condition.

Figure 1:
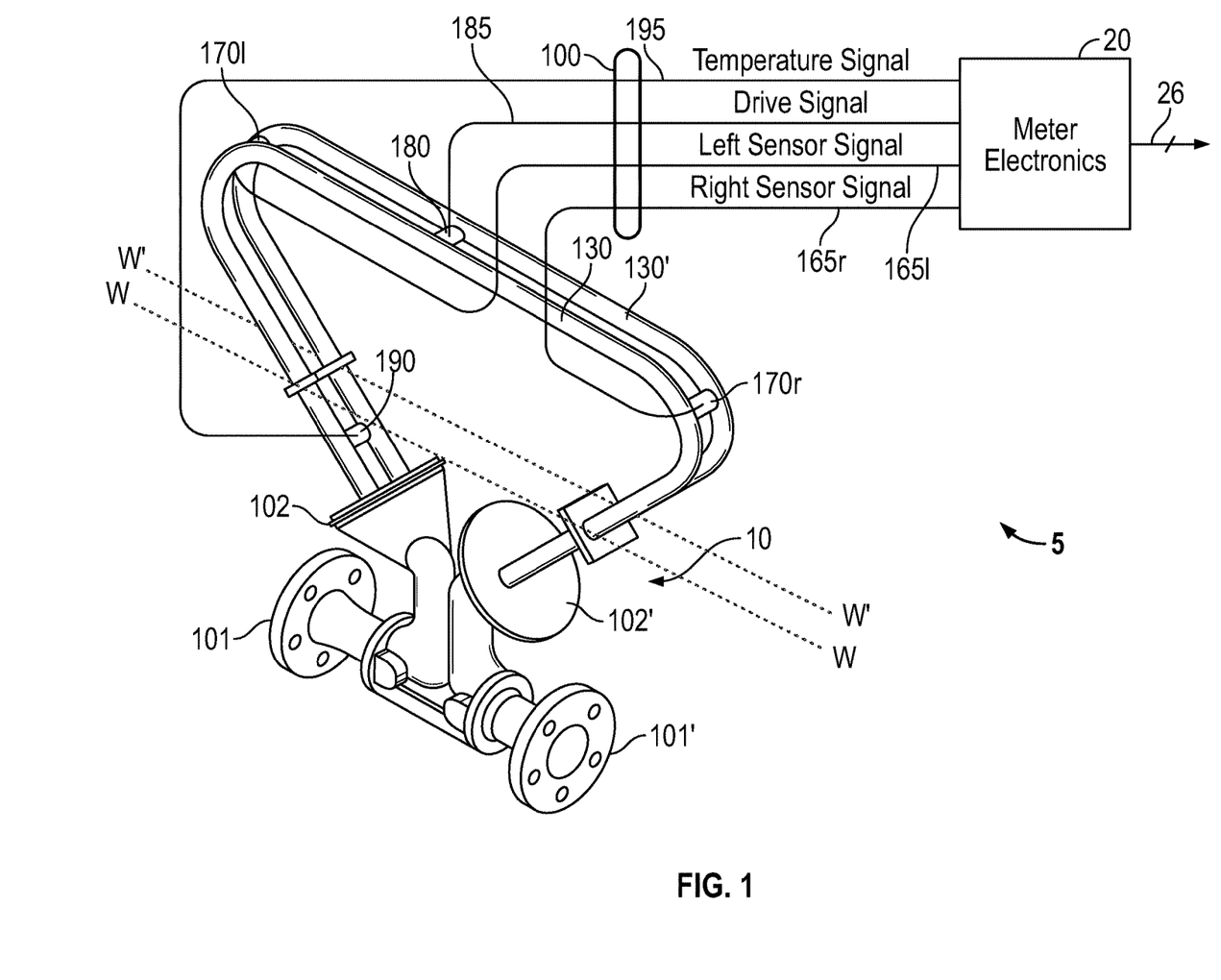
FIG. 1 illustrates an example of a vibratory meter 5 in the form of a Coriolis flowmeter comprising a sensor assembly 10 and one or more meter electronics 20.

FIG. 1 illustrates an example of a vibratory meter 5 in the form of a Coriolis flowmeter comprising a sensor assembly 10 and one or more meter electronics 20. The one or more meter electronics 20 are connected to sensor assembly 10 to measure a characteristic of a flowing material, such as, for example, density, mass flow rate, volume flow rate, totalized mass flow, temperature, and other information.

The sensor assembly 10 includes a pair of flanges 101 and 101', manifolds 102 and 102', and conduits 130 and 130'. Manifolds 102, 102' are affixed to opposing ends of the conduits 130, 130'. Flanges 101 and 101' of the present example are affixed to manifolds 102 and 102'. Manifolds 102 and 102' of the present example are affixed to opposite ends of spacer 106. The spacer 106 maintains the spacing between manifolds 102 and 102' in the present example to prevent undesired vibrations in conduits 130 and 130'. The conduits 130 and 130' extend outwardly from the manifolds in an essentially parallel fashion. When the sensor assembly 10 is inserted into a pipeline system (not shown) which carries the flowing material, the material enters sensor assembly 10 through flange 101, passes through inlet manifold 102 where the total amount of material is directed to enter conduits 130 and 130', flows through conduits 130 and 130' and back into outlet manifold 102' where it exits the sensor assembly 10 through the flange 101'.

The sensor assembly 10 includes a driver 180. The driver 180 is affixed to conduits 130 and 130' in a position where the driver 180 can vibrate the conduits 130, 130' in the drive mode. More particularly, the driver 180 includes a first driver component (not shown) affixed to conduit 130 and a second driver component (not shown) affixed to conduit 130'. The driver 180 may comprise one of many well-known arrangements, such as a magnet mounted to the conduit 130 and an opposing coil mounted to the conduit 130'. The driver 180 can receive a drive signal 185 from the meter electronics 20.

In the present example, the drive mode is the first out of phase bending mode and the conduits 130 and 130' are preferably selected and appropriately mounted to inlet manifold 102 and outlet manifold 102' so as to provide a balanced system having substantially the same mass distribution, moments of inertia, and elastic moduli about bending axes W-W and W'-W', respectively. In the present example, where the drive mode is the first out of phase bending mode, the conduits 130 and 130' are driven by the driver 180 in opposite directions about their respective bending axes W-W and W'-W'. A drive signal in the form of an alternating current can be provided by one or more meter electronics 20, such as for example via pathway 110, and passed through the coil to cause both conduits 130, 130' to oscillate. Those of ordinary skill in the art will appreciate that other drive modes may be used within the scope of the present invention.

The sensor assembly 10 shown includes a pair of pickoffs 170l, 170r that are affixed to conduits 130, 130'. More particularly, a first pickoff component is located on conduit 130 and a second pickoff component is located on conduit 130'. In the embodiment depicted, the pickoffs 170l, 170r may be electromagnetic detectors, for example—pickoff magnets and pickoff coils that produce pickoff signals that represent the velocity and position of the conduits 130, 130'. For example, the pickoffs 170l, 170r may supply pickoff signals to the one or more meter electronics via left and right sensor signals 165l, 165r. Those of ordinary skill in the art will appreciate that the motion of the conduits 130, 130' is proportional to certain characteristics of the flowing material, for example, the mass flow rate and density of the material flowing through the conduits 130, 130'.

It should be appreciated that while the sensor assembly 10 described above comprises a dual flow conduit flowmeter, it is well within the scope of the present invention to implement a single conduit flowmeter. Furthermore, while the conduits 130, 130' are shown as comprising a curved flow conduit configuration, the present invention may be implemented with a flowmeter comprising a straight flow conduit configuration. Therefore, the particular embodiment of the sensor assembly 10 described above is merely one example and should in no way limit the scope of the present invention.

In the example shown in FIG. 1, the one or more meter electronics 20 receive the pickoff signals from the pickoffs 170l, 170r. Path 26 provides an input and an output means that allows one or more meter electronics 20 to interface with an operator. The one or more meter electronics 20 measure a characteristic of a flowing material, such as, for example, a phase difference, a frequency, a time delay, a density, a mass flow rate, a volume flow rate, a totalized mass flow, a temperature, a meter verification, and other information. More particularly, the one or more meter electronics 20 receive one or more signals, for example, from pickoffs 170l, 170r and one or more temperature sensors 190, such as a resistive temperature device (RTD), and use this information to measure a characteristic of a flowing material. In the embodiment shown in FIG. 1, the meter electronics 20 receives a temperature signal 195 from the temperature sensor 190.

The techniques by which vibrating sensor assemblies, such as for example, Coriolis flowmeters or densitometers, measure a characteristic of a flowing material are well understood; therefore, a detailed discussion is omitted for brevity of this description.

As discussed briefly above, one problem associated with sensor assemblies, such as Coriolis flowmeters, is the presence of a zero offset, which is the measured time delay of the pickoffs 170l, 170r at zero fluid flow. If the zero offset is not taken into account when calculating the flow rate and various other flow measurements, the flow measurements will typically include an error. The typical prior art approach to compensate for the zero offset is to measure an initial zero offset ($\Delta t_0$) during an initial calibration process, which usually involves closing valves and providing a zero flow reference condition. Such calibration processes are generally known in the art and a detailed discussion is omitted for brevity of the description. Once an initial zero offset is determined, during operation, flow measurements are corrected by subtracting the initial zero offset from the measured time difference according to equation (1).

$$\dot{m} = FCF(\Delta t_{measured} - \Delta t_0) \quad (1)$$

Where:
$\dot{m}$=mass flow rate
FCF=Flow calibration factor
$\Delta t_{measured}$=measured time delay
$\Delta t_0$=initial zero offset It should be appreciated that equation (1) is merely provided as an example and should in no way limit the scope of the present invention. Although equation (1) is provided to calculate mass flow rate, it should also be appreciated that various other flow measurements may be affected by the zero offset and therefore, may also be corrected.

Figure 2:
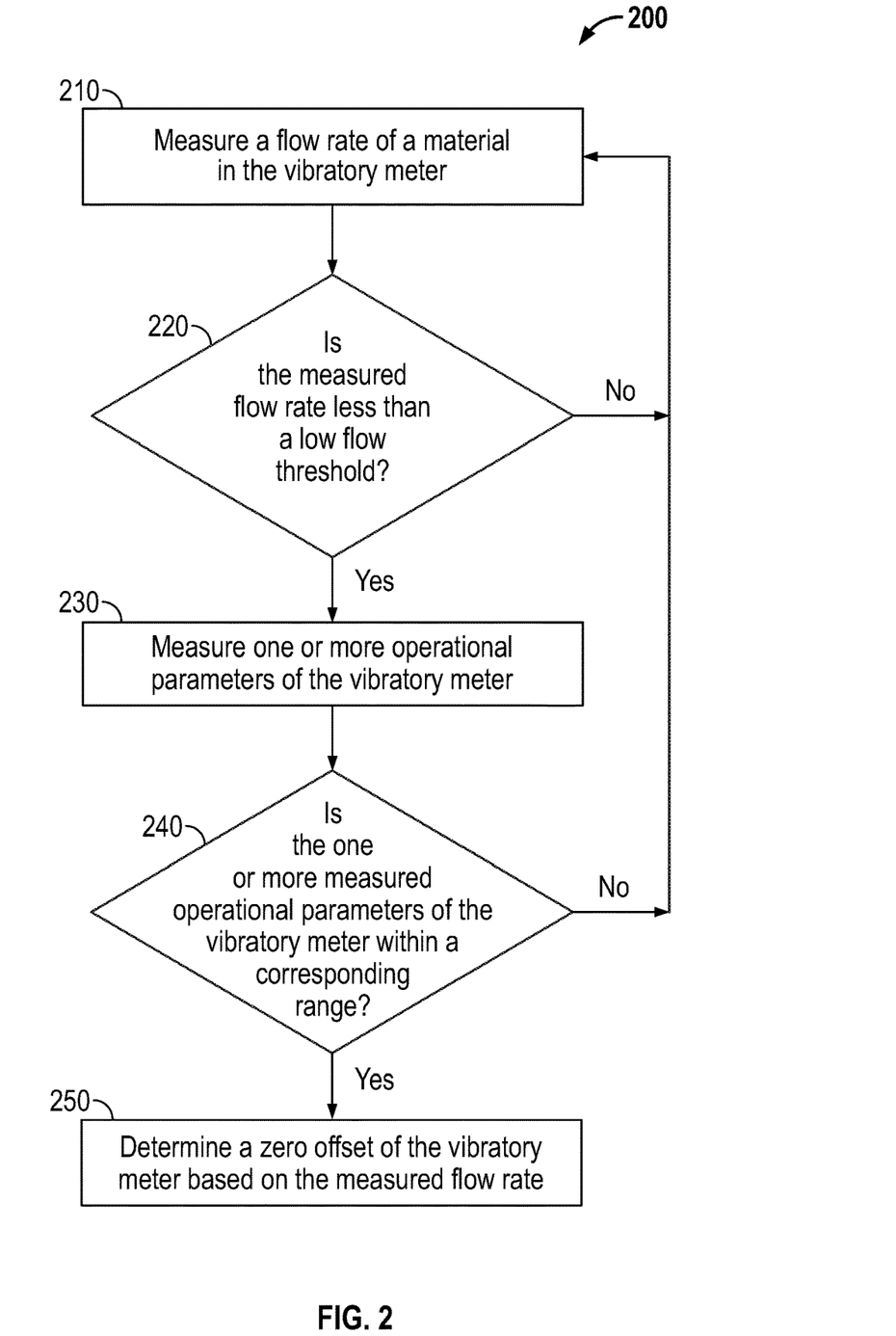
FIG. 2 shows a method 200 of determining a zero offset at a process condition.

FIG. 2 shows a method 200 of determining a zero offset at a process condition. As shown in FIG. 2, the method 200 measures a flow rate of a material in the vibratory meter in step 210. In step 220, the measured flow rate is compared to a low flow threshold. If the measured flow rate is not less than the low flow threshold, then the method 200 returns to step 210. If the measured flow rate is less than the low flow threshold, then the method 200 proceeds to step 230. In step 230, the method 200 measures one or more operational parameters of the vibratory meter. The measured one or more operational parameters of the vibratory meter are compared to a corresponding range in step 240. If the one or more measured operational parameters are not within the corresponding range, then the method 200 proceeds to step 210. If the one or more measured operational parameters are within the corresponding range, then the method proceeds to step 250, where the zero offset of the vibratory meter is determined based on the measured flow rate.

The method 200, in step 210, can measure the flow rate of the material in the vibratory meter 5 described in the above with reference to FIG. 1. For example, the meter electronics 20 can provide a drive signal to the driver 180, which can vibrate the conduits 130, 130'. The vibratory meter 5 can determine the flow rate from the phase difference between the pickoffs 170l, 170r. The flow rate can be measured at a process condition. That is, the measured flow rate is measured during actual transfer of the fluid rather than a measured flow rate of, for example, water at calibration conditions. The process conditions can, for example, occur at non-nominal temperatures and with the actual fluid to be measured.

In step 210, the method 200 can compare the measured flow rate with the low flow threshold, which may be a predetermined value that is stored in the meter electronics 20. For example, the meter electronics 20 can include a processor that obtains the low flow threshold from a memory in the meter electronics 20 and compares the measured flow rate to the low flow threshold to determine if the measured flow rate is within a range with a lower and upper low flow threshold. The lower flow threshold can be a negative number, as will be explained in the following with reference to FIGS. 4 and 5.

In step 230, the method 200 can measure the one or more operational parameters using various sensors, such as the pickoffs 170l, 170r, and the one or more temperature sensors 190 described with reference to FIG. 1. The operational parameters are not the measured flow rate. The one or more operational parameters are also correlated with a no-flow condition in the vibratory meter at a process condition. That is, the operational parameters are non-flow rate parameters of the vibratory meter 5 and are not measured during a calibration condition. For example, the operational parameter may be a temperature of one of the conduits 130, 130', a density of the material, a resonant frequency of the conduits 130, 130' containing the material, a voltage of the pickoffs 170l, 170r, and/or the like. Any parameter that can be correlated with an actual no-flow condition may be employed.

One or more measurements may be performed for each of the one or more operational parameters. For example, the measured operational parameters can be comprised of consecutive measurements. With reference to the temperature measurement example discussed above, the one or more operational parameters may be comprised of temperature measurements, which may be comprised of consecutive temperature measurements. Similarly, the one or more operational parameters may be comprised of density measurements, which may be comprised of consecutive density measurements.

The one or more measured operational parameter can also be comprised of a plurality of measured operational parameters. For example, the one or more measured operational parameters can be comprised of temperature, density, resonant frequency, and pickoff voltage measurements, which can respectively be comprised of consecutive temperature, density, resonant frequency, and pickoff voltage measurements. Additionally or alternatively, each of the one or more operational parameter measurements may be comprised of more or fewer measurements than the other measured operational parameters. For example, the one or more measured operational parameter may be comprised of five temperature measurements and ten density measurements. The one or more measured operational parameters may also be comprised of groups of consecutive measurements.

In step 240, the method 200 can compare the one or more operational parameters to a corresponding range to determine if the measured flow rate occurred during a no-flow condition of the flow meter. For example, if the one or more operational parameters comprise a temperature of the conduits 130, 130', then the measured temperature may be compared to a range of −265° F. to −220° F. If the measured temperature is not within the corresponding range, then the method 200 proceeds to step 210. The method 200 may also discard the flow rate measurement as being an actual flow rate measurement. That is, the temperature being outside the corresponding range indicates that the flow rate was measured when the material was flowing in the vibratory meter.

If the one or more operational parameters are within the corresponding range, then the method 200 determines a zero offset based on the measured flow rate. For example, step 240 can compare consecutive temperature and density measurements to their corresponding ranges. If all of the consecutive temperature and density measurements are within their corresponding ranges, then the measured flow rate is verified as a true no-flow measurement and can therefore be used as a new zero offset. Alternative criteria can be employed, such as one out of ten, a certain percentage, etc., to determine that the measured flow rate is a measurement during a no-flow condition in the vibratory meter.

In step 250, the zero offset can be determined using the measured flow rates based on any suitable number of measured flow rates. For example, although an actual no-flow condition may only be determined if a plurality or all of the measured flow rates are less than the low flow threshold, the zero offset may be determined using just one of the measured flow rates that is less than the low flow threshold. Alternatively, the zero offset may be determined by averaging the plurality or all of the measured flow rates. As can be appreciated, the zero offset can be determined based on the measured flow rates using any suitable method.

As will be discussed in more detail in the following with reference to FIG. 3, the meter electronics 20 can measure the flow rate and the one or more operational parameters and perform the comparisons using values.

Figure 3:
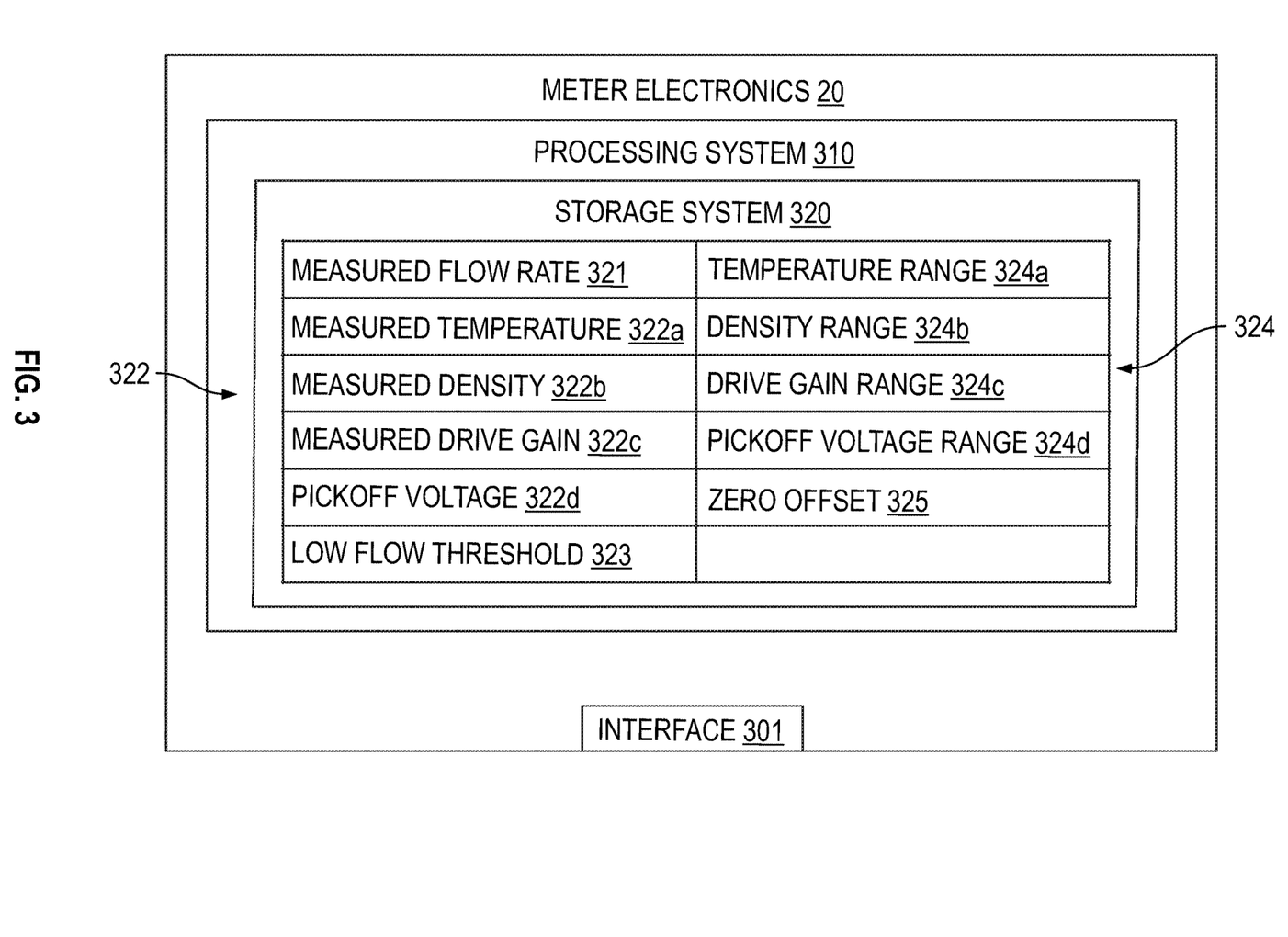
FIG. 3 shows the meter electronics 20 including a processing system 310 and a storage system 320.

FIG. 3 shows the meter electronics 20 including a processing system 310 and a storage system 320. The processing system 310 is shown as including the storage system 320, although the storage system 320 may be separate and distinct from the processing system 310 in alternative embodiments. The storage system 320 is shown as including stored values. The stored values include a measured flow rate 321, one or more measured operational parameters 322, a low flow threshold 323, one or more corresponding ranges 324, and a zero offset 325.

In the embodiment shown, the one or more measured operational parameters 322 is comprised of a measured temperature 322a, a measured density 322b, a measured drive gain 322c, and a pickoff voltage 322d. The one or more corresponding ranges 324 is shown as being comprised of a temperature range 324a, density range 324b, drive gain range 324c, and a pickoff voltage range 324d. As can be appreciated, each of the one or more operational parameters 322 has a corresponding range 324. For example, the temperature range 324a corresponds to the measured temperature 322a.

The meter electronics 20 or, more particularly, the processing system 310, can perform the method 200 described above. For example, the meter electronics 20 can measure the flow rate of the material in the vibratory meter 5 using the left and right sensor signals 165l, 165r provided by the sensor assembly 10 and the zero offset 325. That is, the zero offset 325 may be an initial zero offset $\Delta t_0$ determined during calibration, which is applied to a measured time delay $\Delta t_{measured}$ to determine a mass flow rate ṁ as the measured flow rate. The measured flow rate can be stored in the storage system 320 as the measured flow rate 321.

The meter electronics 20 may compare the measured flow rate 321 with the low flow threshold 323. If the meter electronics 20 determines that the measured flow rate 321 is less than the low flow threshold 323, the meter electronics 20 can determine that a no-flow condition could possibly be present in the vibratory meter 5. Accordingly, to determine if an actual no-flow condition is present in the vibratory meter 5, the meter electronics 20 can compare one or more operational parameters 322 to their corresponding ranges 324.

For example, the meter electronics 20 may compare the measured temperature 322a to the temperature range 324a, the measured density 322b to the density range 324b, the measured drive gain 322c to the drive gain range 324c, and/or the pickoff voltage 322d to the pickoff voltage range 3246d. The comparisons may indicate that the one or more measured operational parameters 322 are within the corresponding ranges 324 and therefore indicate that a no-flow condition is present in the vibratory meter. In alternative embodiments, other parameters correlated with a no-flow condition can also be measured and compared to thresholds/ranges.

If the one or more operational parameters 322 are within their corresponding ranges 324, then the meter electronics 20 may determine that the measured flow rate 321 represents an actual zero flow. That is, the measured flow rate 321, if a non-zero value, quantifies a zero offset in the flow rate measurement of the vibratory meter 5. The meter electronics 20 can therefore determine the zero offset of the vibratory meter 5 from the measured flow rate 321. For example, the meter electronics 20 store the measured flow rate 321 as the zero offset 325 in the storage system 320. The zero offset 325 can be used for subsequent flow rate measurements to ensure more accurate measurements, as will be discussed in more detail in the following with reference to FIGS. 4 and 5.

Figure 4:
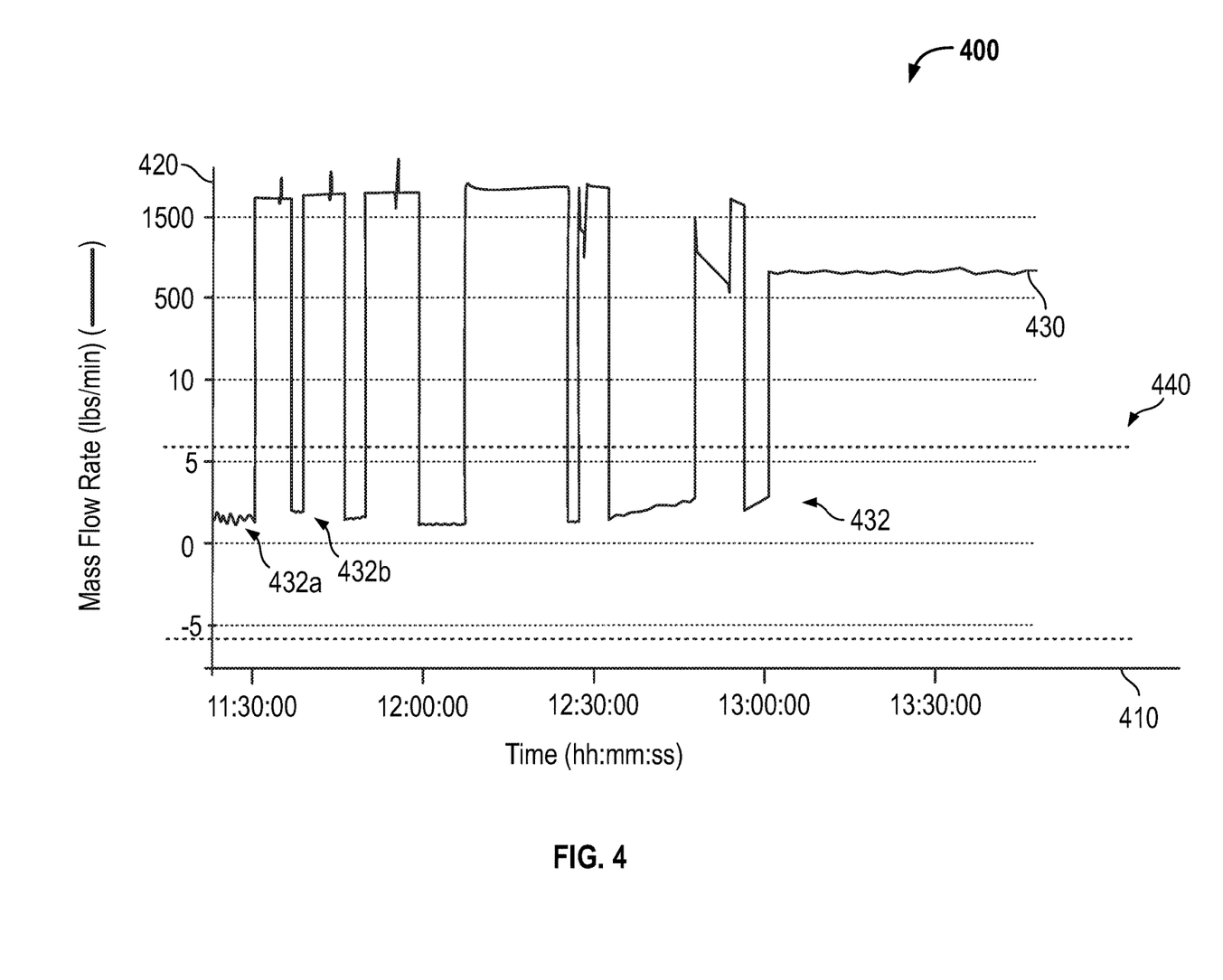
FIG. 4 shows a graph 400 of an exemplary flow rate measurement where a zero offset is not determined at a process condition.

FIG. 4 shows a graph 400 of an exemplary flow rate measurement where a zero offset is not determined at a process condition. The graph 400 includes a time axis 410 and a flow rate axis 420. The time axis 410 ranges from 11:30:00 to 14:00:00. The flow rate axis 420 ranges from −5 lbs/min to 1500 lbs/min. The graph 400 includes a mass flow rate measurement plot 430. The mass flow rate measurement plot 430 includes a plurality of low flow measurements 432. The mass flow rate measurement plot 430 includes a first low flow measurement 432a and a second low flow measurement 432b. The graph 400 also includes low flow thresholds 440.

As can be appreciated, the mass flow rate measurement plot 430 may have an error in the low flow measurements 432. More specifically, the low flow measurements 432 are greater than zero by a consistent value of approximately 3 lbs/min. As can also be appreciated, the meter electronics 20 can perform the method 200, or any other suitable method, to determine that the low flow measurements 432 are actually measurements of a no-flow condition in the vibratory meter 5. For example, in an alternative method, the meter electronics 20 may compare a measured temperature with a corresponding temperature range to determine that the low flow measurements 432 are actual zero flow measurements.

The determination that the actual no-flow condition is present in the vibratory meter 5 may be determined from a single measurement or a plurality of measurements. For example, in some process conditions, a single temperature measurement may be sufficient to determine that a no-flow condition is present in the vibratory meter 5. In other process conditions, a plurality of measurements may be desirable in determining that the no-flow condition is present. For example, a plurality of temperature and density measurements that correspond to one of the low flow measurements 432 may be suitable. Additionally or alternatively, the plurality of measurements may correspond to two or more of the low flow measurements 432.

More specifically, the low flow measurements 432 are shown as a plurality of continuous low flow measurements. That is, each of the low flow measurements 432 is a plurality of consecutive measurements that are less than the low flow threshold 440. The corresponding one or more measured operational parameters may also be comprised of a plurality of consecutive measurements. For example, a plurality of consecutive temperature measurements may be made that correspond to the first low flow measurement 432a.

To determine that an actual no-flow condition is present in the vibratory meter 5, a method, such as the method 200 discussed above, may require that, for example, ten consecutive measured operational parameters be less than or within a corresponding range. For example, when the flow rate measurements illustrated by the mass flow rate measurement plot 430 fall within the low flow thresholds 440, the method may determine if the corresponding ten consecutive temperature measurements are also within their temperature range. If this is true, the method may determine that an actual no-flow condition is present in the vibratory meter 5.

Alternatively, the method 200 may also require that two or more groups of consecutive low flow measurements be less than a low flow threshold. For example, the method 200 may require that the first and second low flow measurements 432a, 432b each have a plurality of consecutive flow rate measurements that are less than the low flow threshold 440. If this is true, and the one or more measured operational parameters are also within their corresponding ranges, then the method 200 may determine that an actual no-flow condition is present in the vibratory meter 5.

If the method determines that the actual no-flow condition is present in the vibratory meter 5, then the method can use a value determined from the low flow measurements 432 as a new zero offset value. For example, if the method determines that a no-flow condition is present during the first low flow measurement 432a, the method may average all of the measurements in the first low flow measurement 432a and use this average value as the new zero offset value. Alternative methods may determine the new zero offset value from two or more, or all, of the low flow measurements 432.

For example, as shown in FIG. 4, a plurality of low flow measurements 432 are present which have not been corrected by a new zero offset value determined at process conditions. The new zero offset value may be determined from all of the low flow measurements 432 shown in FIG. 4, which is about 3 lbs/min. Accordingly, the meter electronics can store the 3 lbs/min value as a new zero offset. This value can be used in subsequent flow rate measurements, which is illustrated in FIG. 5.

Figure 5:
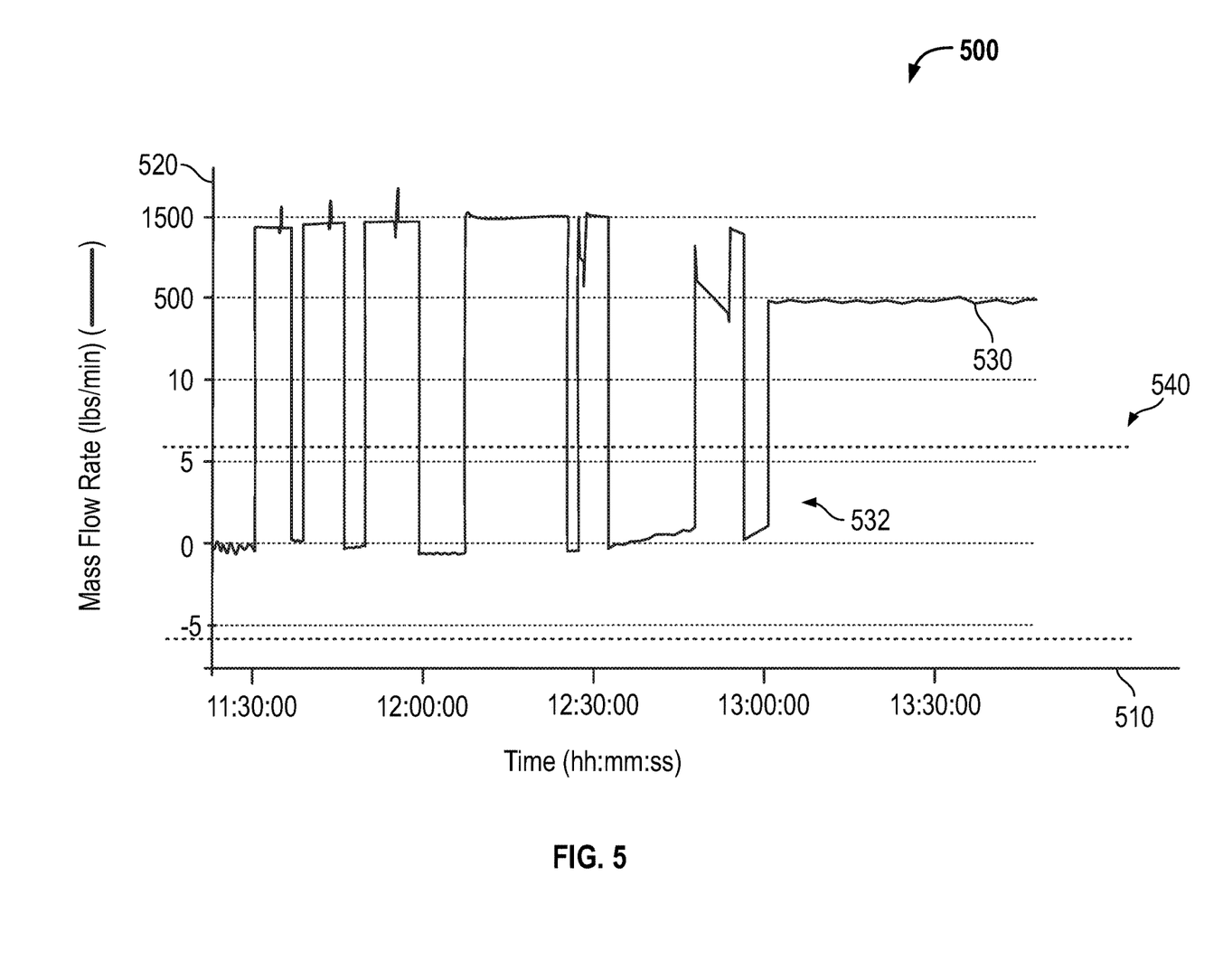
FIG. 5 shows a graph 500 of an exemplary flow rate measurement where the zero offset is determined at a process condition.

FIG. 5 shows a graph 500 of an exemplary flow rate measurement where the zero offset is determined at a process condition. The graph 500 includes a time axis 510 and a flow rate axis 520. The time axis 510 ranges from 11:30:00 to 14:00:00. The flow rate axis 520 ranges from −5 lbs/min to 1500 lbs/min. The graph 500 includes a corrected mass flow rate measurement plot 530. The corrected mass flow rate measurement plot 530 includes a plurality of low flow measurements 532. The graph 500 also includes low flow thresholds 540.

For illustrative purposes, the corrected mass flow rate measurement plot 530 is essentially the same as the mass flow rate measurement plot 430 shown in FIG. 4, except that the corrected mass flow rate measurement plot 530 shown in FIG. 5 is corrected by a new zero offset. More specifically, the low flow measurements 432 in the mass flow rate measurement plot 430 shown in FIG. 4 is used to provide the new zero offset value of −3 lbs/min. Accordingly, the low flow measurements 532 shown in FIG. 5 are substantially zero. In addition, the flow rate measurements shown in the corrected mass flow rate measurement plot 530 are also offset by the new zero offset value.

As a result, a total mass flow measurement calculated using the corrected mass flow rate measurement plot 530 is more accurate. The mass flow rate measurements of actual flow is also more accurate. This results in more accurate calculations of the monetary value of custody transfers, better material flow control systems due to more accurate flow rate feedback loops, etc.

The detailed descriptions of the above embodiments are not exhaustive descriptions of all embodiments contemplated by the inventors to be within the scope of the present description. Indeed, persons skilled in the art will recognize that certain elements of the above-described embodiments may variously be combined or eliminated to create further embodiments, and such further embodiments fall within the scope and teachings of the present description. It will also be apparent to those of ordinary skill in the art that the above-described embodiments may be combined in whole or in part to create additional embodiments within the scope and teachings of the present description.

Thus, although specific embodiments are described herein for illustrative purposes, various equivalent modifications are possible within the scope of the present description, as those skilled in the relevant art will recognize. The teachings provided herein can be applied to other determinations of a zero offset of a vibratory meter at a process condition and not just to the embodiments described above and shown in the accompanying figures. Accordingly, the scope of the embodiments described above should be determined from the following claims.

The invention claimed is:

1. A method of determining a zero offset of a vibratory meter at a process condition, the method comprising:
measuring a flow rate of a material in the vibratory meter;
determining if the measured flow rate is less than a low flow threshold;
measuring one or more operational parameters of the vibratory meter;
determining if the one or more measured operational parameters of the vibratory meter are within a corresponding range; and
if the measured flow rate is less than the low flow threshold and if the one or more measured operational parameters of the vibratory meter are within the corresponding range, then determining that a no-flow condition is present and determining a zero offset of the vibratory meter based on the measured flow rate.

2. The method of claim 1, wherein the one or more measured operational parameters of the vibratory meter comprise at least one of a temperature, density, pickoff voltage, and drive gain.

3. The method of claim 1, wherein the zero offset comprises a difference between the measured flow rate and zero flow.

4. The method of claim 1, wherein measuring the one or more operational parameters comprises measuring each of the one or more operational parameters a plurality of times when the measured flow rate is less than the low flow threshold.

5. The method of claim 1, wherein determining a zero offset of the vibratory meter based on the measured flow rate that is less than the low flow threshold comprises determining the zero offset if a plurality of measurements of each of the one or more measured operational parameters is within the corresponding range.

6. The method of claim 1, wherein:
the measured flow rate of the material in the vibratory meter comprises a plurality of measured flow rates.

7. The method of claim 6, wherein the plurality of the measured flow rates comprises at least one group of measured flow rates that are consecutive.

8. The method of claim 1, wherein the zero offset is determined based on the measured flow rate if and only if all of the one or more measured parameters are within the corresponding range.

9. The method of claim 1, further comprising measuring the flow rate the material with the zero offset of the vibratory meter determined based on the measured flow rate that is less than the low flow threshold.

10. A vibratory meter (5) with a zero offset at a process condition, the vibratory meter (5) comprising:
a sensor assembly (10); and
a meter electronics (20) communicatively coupled to the sensor assembly (10), the meter electronics (20) being configured to:
measure a flow rate of a material in the sensor assembly (10);
determine if the measured flow rate is less than a low flow threshold;
measure one or more operational parameters of the material;
determine if the one or more measured operational parameters is within a corresponding range; and
if the measured flow rate is less than the low flow threshold and if the one or more measured operational parameters of the vibratory meter (5) are within the corresponding range, then determining that a no-flow condition is present and determining a zero offset of the vibratory meter (5) based on the measured flow rate.

11. The vibratory meter (5) of claim 10, wherein the one or more measured operational parameters of the vibratory meter comprise at least one of a temperature, density, pickoff voltage, and drive gain.

12. The vibratory meter (5) of claim 10, wherein the zero offset comprises a difference between the measured flow rate and zero flow.

13. The vibratory meter (5) of claim 10, wherein the meter electronics (20) being configured to measure the one or more operational parameters comprises the meter electronics (20) being configured to measure each of the one or more operational parameters a plurality of times when the measured flow rate is less than the low flow threshold.

14. The vibratory meter (5) of claim 10, wherein the meter electronics (20) being configured to determine a zero offset of the vibratory meter (5) based on the measured flow rate that is less than the low flow threshold comprises the meter electronics (20) being configured to determine the zero offset if a plurality of measurements of each of the one or more measured operational parameters is within the corresponding range.

15. The vibratory meter (5) of claim 10, wherein:
the measured flow rate of the material in the vibratory meter comprises a plurality of measured flow rates.

16. The vibratory meter (5) of claim 15, wherein the plurality of the measured flow rates comprises at least one group of measured flow rates that are consecutive.

17. The vibratory meter (5) of claim 10, wherein the zero offset is determined based on the measured flow rate if and only if all of the one or more measured parameters are within the corresponding range.

18. The vibratory meter (5) of claim 10, further comprising the meter electronics (20) being configured to measure the flow rate the material with the zero offset of the vibratory meter (5) determined based on the measured flow rate that is less than the low flow threshold.

* * * * *

UNITED STATES PATENT AND TRADEMARK OFFICE
CERTIFICATE OF CORRECTION

| | |
|---|---|
| PATENT NO. | : 11,085,808 B2 |
| APPLICATION NO. | : 16/491762 |
| DATED | : August 10, 2021 |
| INVENTOR(S) | : Salvatore D. Greco |

It is certified that error appears in the above-identified patent and that said Letters Patent is hereby corrected as shown below:

In the Specification

Column 9, Line 33, replace "3246d." with --324d.--.

Signed and Sealed this
Twenty-eighth Day of November, 2023

*Katherine Kelly Vidal*

Katherine Kelly Vidal
*Director of the United States Patent and Trademark Office*